United States Patent
Chang et al.

(10) Patent No.: US 7,900,012 B2
(45) Date of Patent: Mar. 1, 2011

(54) SECURE STORAGE APPARATUS AND METHOD FOR CONTROLLING THE SAME

(75) Inventors: Yu-An Chang, Hsin-Chu Hsien (TW); Chien-Chen Liou, Hsin-Chu Hsien (TW)

(73) Assignee: Phison Electronics Corp., Hsinchu (TW)

( * ) Notice: Subject to any disclaimer, the term of this patent is extended or adjusted under 35 U.S.C. 154(b) by 639 days.

(21) Appl. No.: 11/783,942

(22) Filed: Apr. 13, 2007

(65) Prior Publication Data
US 2008/0256322 A1 Oct. 16, 2008

(51) Int. Cl.
*G06F 13/00* (2006.01)
(52) U.S. Cl. .................. 711/170; 711/173; 713/183; 726/27
(58) Field of Classification Search .......... 711/173, 711/170; 713/183; 726/27
See application file for complete search history.

(56) References Cited

U.S. PATENT DOCUMENTS

| 6,401,181 B1 * | 6/2002 | Franaszek et al. ........... 711/170 |
| 2005/0005131 A1 * | 1/2005 | Yoshida et al. ............. 713/183 |
| 2006/0156036 A1 | 7/2006 | Oh et al. |
| 2006/0200864 A1 * | 9/2006 | Nakanishi et al. ............ 726/27 |

FOREIGN PATENT DOCUMENTS

| CN | 1461999 A | 12/2003 |
| TW | 576973 | 2/2004 |

* cited by examiner

*Primary Examiner*—Yong Choe
(74) *Attorney, Agent, or Firm*—Bacon & Thomas, PLLC

(57) ABSTRACT

The present invention discloses a storage apparatus in communication with one or more external systems, including at least one storage region, at least one logical partition formed by using a first part of the storage region for storing data, and a logic controller, provided with an authentication module for setting one access mode for controlling access to the logical partition according to the access mode when a vendor command from the external system requesting access to the logical partition is received.

13 Claims, 4 Drawing Sheets

SECURE STORAGE APPARATUS AND METHOD FOR CONTROLLING THE SAME

FIELD OF THE INVENTION

The present invention relates to a storage apparatus and method for controlling the same, and more particularly, to a secure storage apparatus in communication with external systems and method for controlling the same.

BACKGROUND OF THE INVENTION

As well known, FAT (File Allocation Table) is relatively uncomplicated and supported by virtually all existing operating systems, especially personal computers. As its name suggested, the most common implementation is the usage of a table which centralizes the information about which areas belong to files and are free or possibly unusable, and where each file is stored on a disk. The ubiquity makes it an ideal format for floppy disks, solid-state memory cards, and the like, as well as makes it easier to pose unprecedented threats to personal data security and privacy. There is a need, therefore, for an improved storage apparatus compatible with the FAT file system for ensuring the confidentility of the data/files stored therein while interconnected to external systems.

Referring now to FIG. 1, it illustrates a flowchart for implementing host-dependent behavior according to U.S. Pat. No. 7,100,160. The first step, represented by block 10, comprises a host-target device log-in process wherein the host and the target device, such as a disk array controller, exchange information on capabilities of each device and form a communication connection. During this log-in process, the host would provide its host designator to the target device. After successful login, the target is allowed to receive commands from the host, as represented by block 12. For any given received command, the target determines whether the execution of the command depends on the protocol of the host in block 15. This step could be performed by comparing the received command to a list of commands that have O/S dependent requirements. If the command executes without regard to the host protocol, the following steps are not performed and the routine is exited at block 18. If there is a match to an O/S dependent command, then the following steps are performed.

The next step in the process, represented by block 20, obtains the value of a mode parameter that defines the default O/S protocol. For example, this mode parameter could be set to default to a HPUX protocol for all worldwide names not listed in the table. A further step in the process, represented by block 30, comprises accessing the aforementioned table which stores host designators and O/S types associated therewith. The flowchart further includes the step, represented by block 40, of determining if there is a match of the host designator obtained during the log-in process in block 10, to a host designator in the table. If there is such a match to a host designator in the table, then the method operates to override the default mode parameter designation for the O/S protocol, and to select the O/S protocol associated with the matched host designator. This step is represented by block 50 in FIG. 1.

As discussed above, the prior art provides a method and system only to tackle with certain ambiguities and compatibility problems that heterogeneous hosts may cause, by selecting an appropriate protocol associated with the host, but overlooks that guarding the data from unauthorized leakage is the most high-profile issue. Hence, it needs to provide a storage apparatus with an effective security method to avoid the risk of unintended access to confidential data/files. Unlike conventional memory devices (such as the memory device of U.S. Pat. No. 7,100,160), the present invention does not act transparently or allow arbitrary access to private data/files, and solve the above problems.

SUMMARY OF THE INVENTION

In light of the prior deficiencies, it is an object of the present invention to provide a storage apparatus and method for use with an external system utilizing FAT file system, wherein a logic controller is introduced to regulate accesses therebetween.

In accordance with an aspect of the present invention, the storage apparatus in communication with one or more external systems comprises at least one storage region, at least one logical partition formed by using a first part of the storage region for storing data, and a logic controller, provided with an authentication module for setting one access mode for controlling access to the logical partition according to the access mode when a vendor command from the external system requesting access to the logical partition is received.

In a further aspect of the present invention, the logic controller is further provided with a host verifying module for receiving the vendor command.

In a further aspect of the present invention, the storage apparatus further comprises a table formed by using a second part of the storage region for indexing data entries.

In a further aspect of the present invention, the logical partition comprises one or more normal areas accessible when the storage apparatus is loaded to the external systems.

In a further aspect of the present invention, the logical partition comprises one or more secure areas accessible only when the storage apparatus is loaded to a specified one of the external systems.

In a further aspect of the present invention, the secure areas have authentic entries and false entries.

In a further aspect of the present invention, the secure areas comprise one or more hidden zones for storing the authentic entries.

In a further aspect of the present invention, the access mode comprises a device recognition mode for allowing access to the logical partition.

In a further aspect of the present invention, the access mode comprises a device restriction mode for prohibiting access to the secure area of the logical partition.

In accordance with another aspect of the present invention, a controlling method for accessing a storage apparatus which has at least one logical partition comprising one or more normal areas and secure areas in communication with one or more external systems, comprising the steps of: a) requesting access to the logical partition for data stored therein; b) determining if the data is stored in the normal areas or the secure areas; c) verifying whether the external system is previously specified if the data is stored in the secure areas; d) setting an access mode for the logical partition; and e) outputting request result in accordance with the access mode.

In a further aspect of the present invention, the storage apparatus further comprises a table formed by using a part of the storage region for indexing data entries.

In a further aspect of the present invention, the logical partition comprises one or more normal areas accessible when the storage apparatus is loaded to the external systems.

In a further aspect of the present invention, the logical partition comprises one or more secure areas accessible only when the storage apparatus is loaded to a specified one of the external systems.

In a further aspect of the present invention, the secure areas have authentic entries and false entries.

In a further aspect of the present invention, the secure areas comprise one or more hidden zones for storing the authentic entries.

In a further aspect of the present invention, the access mode comprises a device recognition mode for allowing access to the logical partition.

In a further aspect of the present invention, the access mode comprises a device restriction mode for prohibiting access to the secure areas of the logical partition.

In a further aspect of the present invention, the controlling method further comprises step of retrieving the false entries if the external system is not previously specified.

In a further aspect of the present invention, the controlling method further comprises step of retrieving the authentic entries if the external system is previously specified.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention discloses a secure storage apparatus and a controlling method for application in the same. The objects and advantages of the present invention will become more readily apparent to those ordinarily skilled in the art after reviewing the following detailed description.

Figure 1:
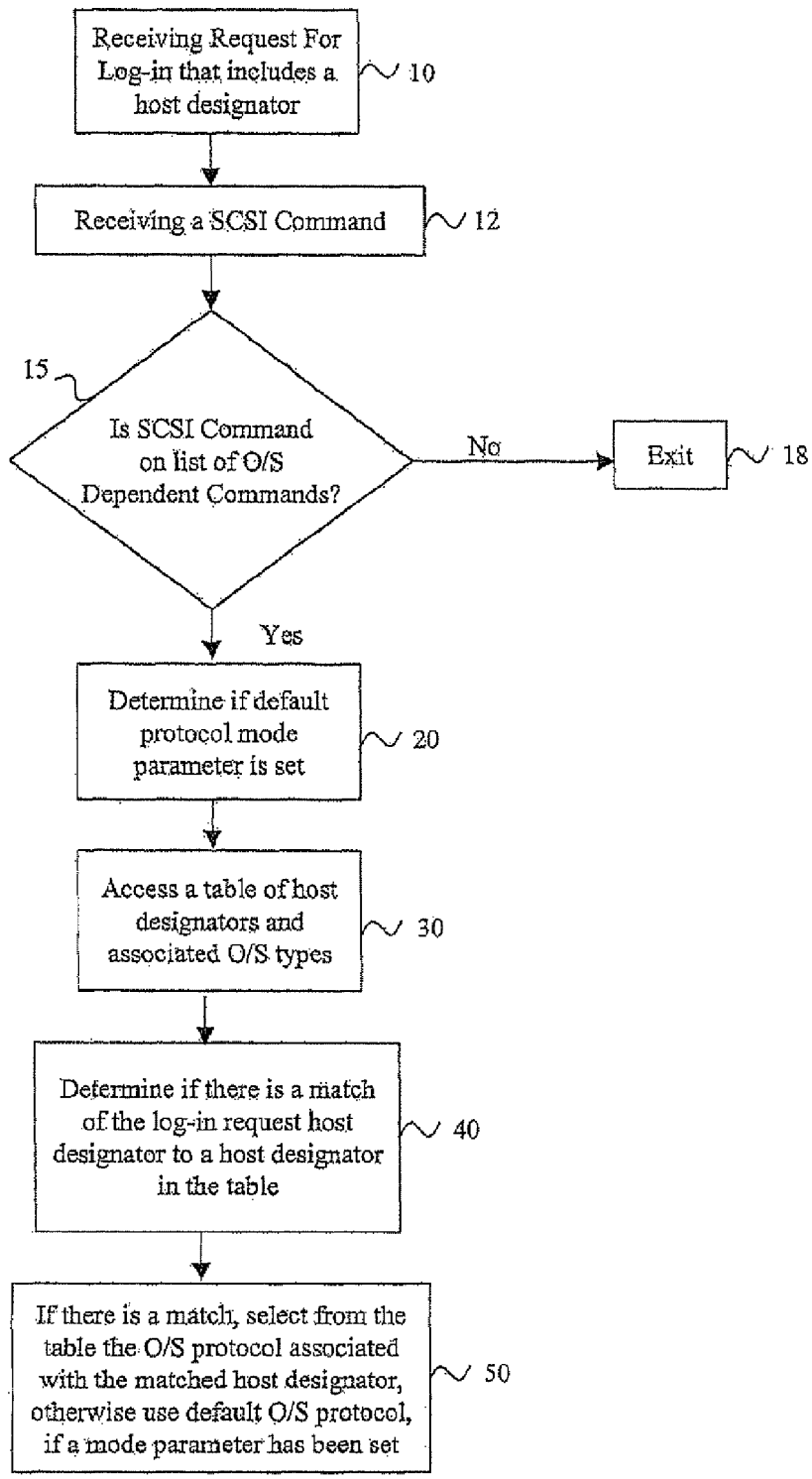
FIG. 1 is a schematic diagram for implementing host-dependent behaviors according to the prior art.
Figure 2:
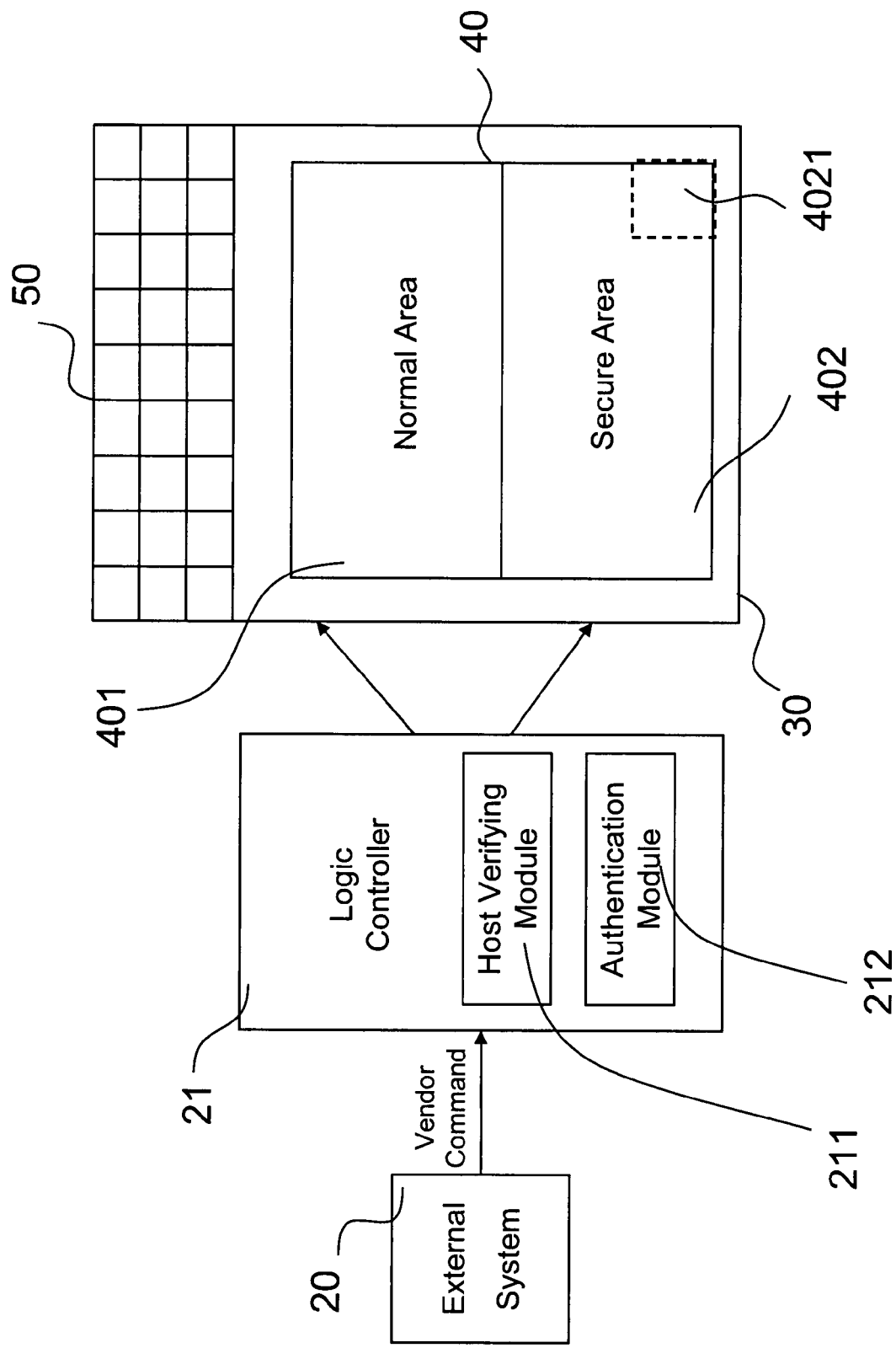
FIG. 2 illustrates a preferred architecture of a storage apparatus for use with a external system according to the present invention.

Please refer to FIG. 2. It illustrates a secure architecture of a storage apparatus in communication with an external system according to the present invention. As illustrated, the storage apparatus, desirably a USB flash drive, includes a logic controller 21 for communication with an external system 20, a storage region 30, and a logic controller 21 comprising a host verifying module 211 for receiving a vendor command from the external system 20 and an authentication module 212 for setting access modes, which would be expatiated in the follow-up descriptions.

In the storage apparatus, in addition to the logic controller 21 and the storage region 30, there are provided with a logical partition 40 formed by using a first part of the storage region 30 for storing data/files, and a table 50 formed by using a second part of the storage region 30 for indexing information of the files, wherein the logical partition 40 is partitioned into a normal area 401 and a secure area 402. The normal area 401 is accessible whenever the storage apparatus is loaded to the external system 20, yet the secure area 402 is accessible only when the external system 20 is verified to be previously specified. Besides, the secure area 402 is allocated at a predefined logical address, and this information indicating the correct address of the secure area 402 is stored in a hidden zone 4021 of the secure area 402. Meanwhile, false information indicating the incorrect address for the secure area 402 is stored in a table 50 consisting of various equal-sized entries, as illustrated in FIG. 2, containing information of the file structures, addresses, and attributes. The size of each entry is subject to the file system version ranging from FAT16 to FAT32, and each entry corresponds to the area with the same address where is stored with the file. Likewise, the normal area 401 is locatable at a predefined logical address.

Further, the authentication module 212 is dedicated to setting either device recognition mode or device restriction mode for the secure area 402 of the logical partition 40, dependent on signal from the logic controller 21. When an unrecognizable vendor command from the external system 20 requesting access to the secure area 402 of the logical partition 40 is received by the host verifying module 211 of the logic controller 21 and verified as non-previously specified, the device restriction mode is set, and the access request of the secure area 402 is not permitted accordingly. In alternate embodiment, the external system 20 will be verified as non-previously specified in the absence of the vendor command, such that the secure area 402 is inaccessible. On the contrary, if the logic controller 211 recognizes the vendor command sent from the external system 20, a protocol for accessing the secure area 402 is delivered, and the device recognition mode is set accordingly.

Figure 3A:
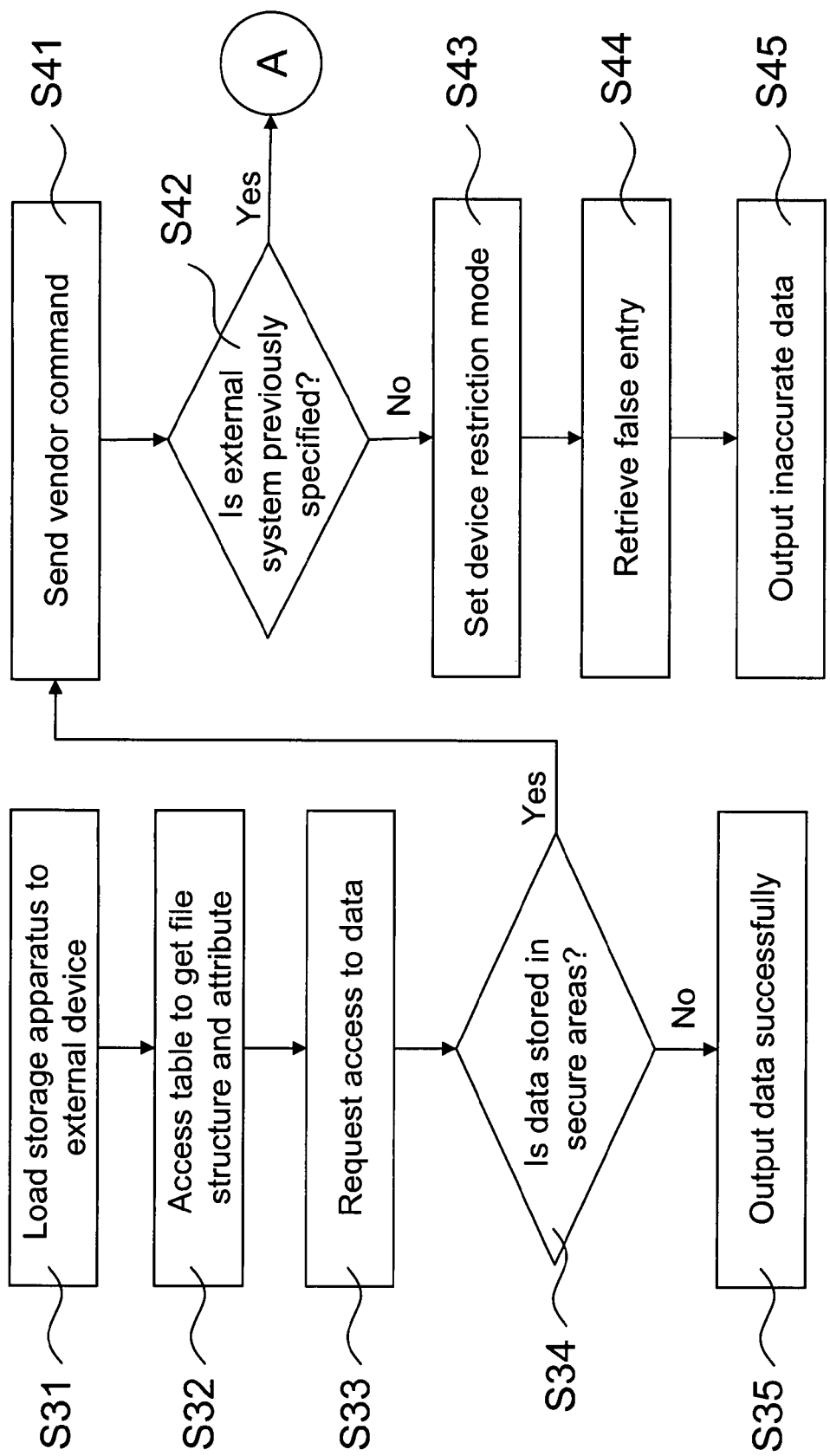
FIGS. 3A-3B shows a flowchart of a preferred embodiment of a method for controlling a storage apparatus according to the present invention.
Figure 3B:
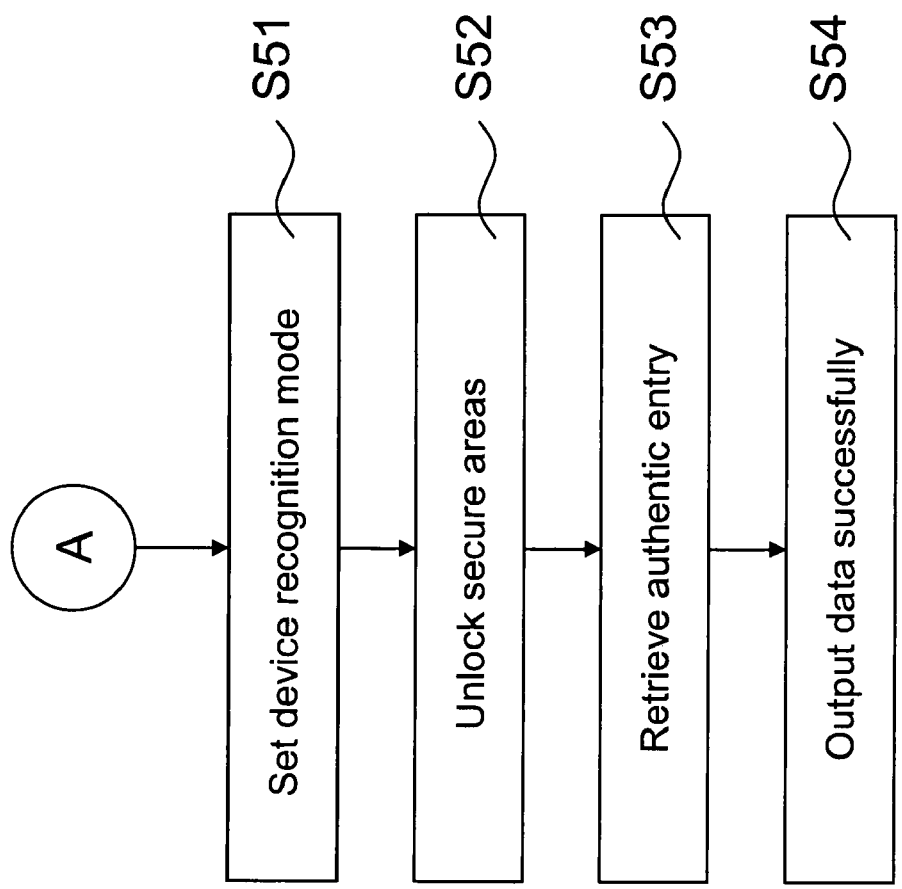

Referring now to FIGS. 3A-3B, they illustrate a flowchart for a method for controlling accesses to a storage apparatus according to the present invention. As shown in step S31 of FIG. 3A, the storage apparatus is provided to the external system 20, and a table 50 is accessed to look up the entry of each file at step S32 of FIG. 3A. After the lookup, the external system 20 further requests access to the file at step S33. Following is step S34. If the requested data is stored in the normal area 401, the file is successfully allocated and output as requested, as shown in step S35 of FIG. 3A.

Under cases that the requested file is stored in the secure area 402, step S34 would proceed with another route starting from S41 of FIG. 3A. A vendor command is sent from the external system 20 to the logic controller 21. In alternate embodiments, vendor commands may differ dependent on external systems having different vendors, operating systems, versions, and the like. At step S42, the host verifying module 211 of the logic controller 21 further verifies whether the vendor command is sent from a previously specified external system. If negative, the authentication module 212 is signaled to switch to the device restriction mode at step S43, and only the false entry in the table is retrieved at step S44. Accordingly, an incorrect file is output in accordance with the information indicated by the false entry at S45 of FIG. 3A. Alternatively, in the absence of the vendor command, the external system 20 is verified as non-previously specified, such that the secure area 402 is inaccessible. On the other hand, if the vendor command is verified sent from a previously specified external system, the step S42 would be directed to another route beginning with step S51.

Please refer to FIG. 3B. At step S51, a protocol is launched from the logic controller 21, and the device recognition mode is switched on in response. Accordingly, the secure area 402 of the logical partition 40 is now relieved of restriction under the device recognition mode at step S52. The authentic entry indicating the accurate location of the requested file is retrievable from the hidden zone 4021 in the secure area 402 at step S53. The operation of accessing accurate file is accomplished at step S54 of FIG. 3B.

In conclusion, the present invention provides a storage apparatus and a controlling method therefor that dramatically enhance overall security of confidential data/files by ensuring that the data stored therein remains unlocatable from non-previously-specified external systems. By way of introduction of a logic controller and a table stored with a series of entries addressing files, it is accomplished that the present invention features compatibility with existing file systems, and appropriately regulates accesses to the files stored in the secure areas. Non-previously-specified external systems are allowed to access files/data stored in normal areas, while accessing the secure areas is not permitted since it only results in retrieving false entries. The authentic entries for indexing data/files stored in the secure areas are exclusively accessible to previously specified external systems. The host verifying module of the logic controller is adapted to docket various vendor commands to distinguish the previously-specified external systems from the non-previously-specified ones. The features of the present invention make it especially well-suited to applications of a USB PenDrive, a SD card, a MMC, a CF card, and a USB flash drive. Differentiated from the prior art allowing arbitrary read/write or other operations, the present invention eliminates the prior potential security holes by prohibiting malicious retrievals of the confidential files stored in the storage apparatus, thereby providing the storage apparatus armed with comprehensive security facilities, and avoiding unintended or ignorant authorization to access the contents to the maximum during read/write operation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A storage apparatus in communication with one or more external systems comprising:
    at least one storage region;
    at least one logical partition formed by using a first part of the storage region for storing data, including one or more secure areas accessible only when the storage apparatus is loaded to a previously specified external system;
    a logic controller, provided with a host verifying, module for receiving a request from the external system requesting access to the logical partition, and the request differs dependent on vendors, operating systems, or versions of the external systems, and provided with an authentication module for setting one access mode for controlling access to the logical partition according to the access mode when the request is received; and
    a table formed by using a second part of the storage region for indexing data entries;
    wherein the host verifying module verifies whether the request is sent from the previously specified external system, and if the request is not sent from the previously specified external system, then a false entry is retrieved in response to the request.

2. The storage apparatus according to claim 1, wherein the logical partition comprises one or more normal areas accessible when the storage apparatus is loaded to the external systems.

3. The storage apparatus according to claim 1, wherein the secure areas have authentic entries and false entries.

4. The storage apparatus according to claim 3, wherein the secure areas comprise one or more hidden zones for storing the authentic entries.

5. The storage apparatus according to claim 1, wherein the access mode comprises a device recognition mode for allowing access to the logical partition.

6. The storage apparatus according to claim 1, wherein the access mode comprises a device restriction mode for prohibiting access to the secure areas of the logical partition.

7. The storage apparatus according to claim 1, comprising a USB Penprive, a secure digital (SD) card, a multi-media card (MMC), and a flash drive.

8. A controlling method for accessing a storage apparatus which has at least one logical partition comprising one or more normal areas and secure areas in communication with one or more external systems, comprising the steps of:
    specifying, at least one external system such that the secure areas are accessible only when the storage apparatus is loaded to the specified external system;
    requesting access to the logical partition for data stored therein;
    determining if the data is stored in the normal areas or the secure areas;
    verifying whether the external system is previously specified if the data is stored in the secure areas;
    retrieving false entries if the external system is not previously specified and retrieving authentic entries if the external system is previously specified;
    setting an access mode for the logical partition; and
    outputting request result in accordance with the access mode;
    wherein the storage apparatus comprises a table formed by using a part of a storage region for indexing data entries.

9. The method according to claim 8, wherein the normal areas are accessible when the storage apparatus is loaded to the external systems.

10. The method according to claim 8, wherein the secure areas comprise one or more hidden zones for storing the authentic entries.

11. The method according to claim 8, wherein the access mode comprises a device recognition mode for allowing access to the logical partition.

12. The method according to claim 8, wherein the access mode comprises a device restriction mode for prohibiting access to the secure areas of the logical partition.

13. The method according to claim 8, wherein the storage apparatus comprises a USB Penprive, a secure digital (SD) card, a multi-media card (MMC), and a flash drive.

* * * * *